United States Patent [19]
Sands

[11] 3,712,146
[45] Jan. 23, 1973

[54] SELF-COMPENSATING RAILWAY HAND BRAKE LINKAGE

[75] Inventor: Ovie L. Sands, Shreveport, La.

[73] Assignee: AMF Incorporated

[22] Filed: March 23, 1971

[21] Appl. No.: 127,211

[52] U.S. Cl. ..........................74/491, 74/505, 188/33
[51] Int. Cl. ...............................................G05g 7/02
[58] Field of Search........74/511, 505, 506, 507, 491; 188/49, 50, 51, 52, 53, 55, 33

[56] References Cited
UNITED STATES PATENTS 1,927,237   9/1933   Klasing..................................74/505

Primary Examiner—Milton Kaufman
Attorney—George W. Price and John H. Gallagher

[57] ABSTRACT

A railway car hand brake mechanism employing lever means and connecting linkages so constructed and arranged as to provide a multiplied braking force to the brake shoes. The multiplication factor remains substantially constant throughout the limits of movement of the mechanism.

7 Claims, 3 Drawing Figures

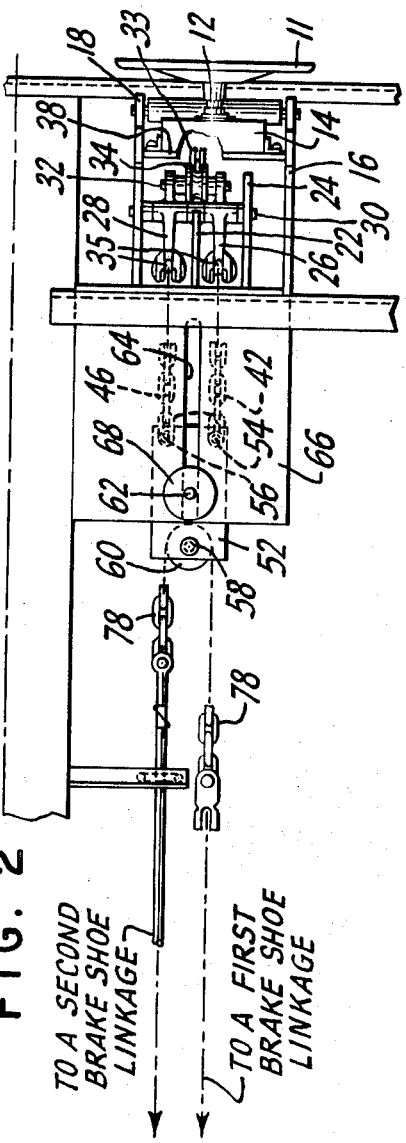
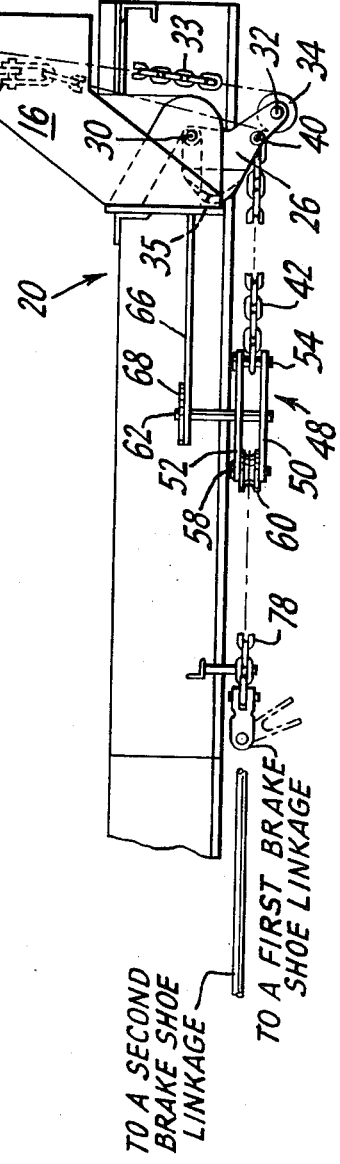
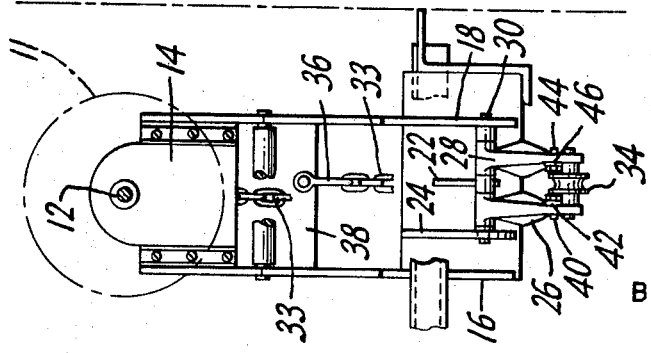
FIG. 1
FIG. 2
FIG. 3
INVENTOR
OVIE L. SANDS
BY
John H. Gallagher
ATTORNEY

3,712,146

SELF-COMPENSATING RAILWAY HAND BRAKE LINKAGE

BACKGROUND OF THE INVENTION

For many years hand brake mechanisms have been used in railway cars such as tank cars and freight cars to hold a car at a given location after it has come to a stop or to stop a slowly moving car. Hand brake control wheels often are located on respective platforms at each end of the body of the railway car while the brakes themselves are located on the trucks under the vehicle. Usually the hand wheel at one end of a car controls the brakes on the truck at that end of the car only. As railway cars became larger and carried greater loads, the braking force required to stop and hold the cars increased substantially. Frequently, to stop or hold a railway car stationary, the hand brake wheel at only one end of the car is used. Thus, the brakes of one truck only, not of both trucks, sometimes are used to hold a car stationary. With use, the brake shoes wear at different rates and it is not uncommon that some brake shoes of a car function improperly. Under these circumstances the braking force present to hold the railway car is seriously reduce, possibly to the point where the brakes are ineffective to hold a car.

SUMMARY OF THE INVENTION

In this invention there is disclosed a simplified and reliable mechanism adapted to apply relatively large forces to brake shoe linkages of a truck of a railway car. When used with two or more brake shoe linkages, the mechanism is self-compensating to apply substantially equal braking forces to the two linkages. In the truck of a railway car, a first brake shoe linkage is coupled to a second brake shoe linkage through a chain that is looped around a pulley carried by a traveling block. The chain assumes the shape of the letter "U." Movement of the traveling block in a direction to cause a force in tension within two arms of the U-shaped chain causes the pulley to roll along the chain until the force transmitted from the block through each arm of the U-shaped chain to each of the brake shoes is equal. First and second bell crank type levers connected to move in unison with each other are interposed between a hand wheel and the traveling block. Turning of the hand wheel in a first direction shortens a pulley chain which is coupled to and urges the first and second crank levers to move simultaneously in a first direction. The pulley chain and the crank levers each multiply the force transmitted from the hand wheel and the increased force is coupled through the traveling block and the U-shaped chains to the brake shoes.

BRIEF DESCRIPTION OF THE DRAWINGS:

FIG. 1 is a side view of a railway hand brake linkage mechanism constructed in accordance with the principles of this invention;

FIG. 2 is a top view of the structure illustrated in FIG. 1; and

FIG. 3 is an end view of the structure illustrated in FIG. 1.

DESCRIPTION OF AN EMBODIMENT OF THE INVENTION

Referring in detail to FIGS. 1–3, a hand wheel 11 adapted for manual operation is rotatably coupled through a shaft 12 to a gear box 14. Two plates 16 and 18 positioned parallel to each other are secured to one end of the frame 20 of the railway freight or tank car by welding or the like. The other ends of the parallel plates 16 and 18 are secured to and support the gear box 14.

Two support members 22 and 24 are positioned between and parallel to plates 16 and 18, and also are secured by welding or the like to the frame 20 of the railway car. Positioned below the gear box 14 and pivotally connected to plate 18 and support members 22 and 24 is a force converting means such as a double bell crank type of lever which functions to transmit a force from a first direction to a second direction with increased magnitude. The double bell crank type of lever comprises a first bell crank type of lever 26 and a second bell crank type of lever 28. The levers are rotatable about a common shaft 30 which is supported by plates 18, 22, and 24. A pin 32 is supported between the outer extremities of the two levers 26 and 28 and supports a pulley roller 34. Shaft 30 defines the fulcrum or pivot axis of the levers and pin 32 functions both as a shaft for pulley 34 and as a locking means to cause the levers 26 and 28 to move together.

A flexible member 33 such as a chain or the like is positioned around pulley 34. One end of chain 33 is anchored by a shackle 36 to a connection plate 38 which is welded to plates 16 and 18. The other end of chain 33 is coupled to a shaft or the like in gear box 14 to be taken up or let out as the hand wheel 11 is rotated. It is seen that the arrangement of chain 33 and pulley 34 constitute a pulley mechanism which provides a mechanical advantage that multiplies the force applied to levers 26 and 28 when chain 33 is drawn up by the rotation of hand wheel 11.

Referring to levers 26 and 28, pin 40 connects a chain 42 to lever 26, and pin 44 couples a chain 46 to lever 28. It should be observed that the pins 40 and 44 are positioned closer to the fulcrum 30 than is the axis of the pulley 34, thereby to provide an additional mechanical advantage in the operation of the levers. That is, since the pin 32 on which pulley roller 34 is mounted is further from fulcrum shaft 30 than are the pins 40 and 44 on which chains 42 and 46 are mounted, the total force available at pins 40 and 44 for transmission to chains 42 and 46 is greater than the force applied to pin 32 by chain 33.

As best seen in FIG. 1, the bell crank type of levers 26 and 28 each have a curved surface 35 which is convex in the general direction toward chains 42 and 46. When chain 33 is drawn up by the rotation of hand wheel 11, levers 26 and 28 rotate in a counterclockwise direction around fulcrum 30 and the curved surfaces 35 progressively move downwardly on top of chains 42 and 46, thus causing the portion of those chains which extend between traveling block 48 and their points of contact with levers 26 and 28 to continue to move in a horizontal direction as they are pulled to the right.

It further is seen that when the levers 26 and 28 rotate in a counterclockwise direction the points where chains 42 and 46 first contact the levers progressively move around curved surfaces 35. The curvature of surface 35 is so chosen that the radial distance from fulcrum 30 to the progressively changing points of first contact of chains 42 and 46 remain substantially constant as levers 26 and 28 rotate. The result of this feature is that the above discussed mechanical advantage achieved by the use of the levers remains substantially constant as a function of the angular rotation of the levers.

As viewed in FIGS. 1 and 2, the left ends of the chains 42 and 46 are connected to a self-compensating force distributing means such as a traveling block 48 which consists of two plates 50 and 52 positioned parallel to each other. The traveling block 48 supports two pins at the right end, one pin 54 for coupling chain 42 to the traveling block, and other pin 56 for coupling chain 46 to the traveling block. Positioned at the left end of the traveling block is a pin 58 which rotatably supports a pulley 60.

A shaft 62 extends upwardly from the traveling block 48 and through a slot 64, FIG. 2, in a horizontally extending support plate 66. Support plate 66 is secured to the frame of the railway car. A relatively large flat plate or washer 68 is secured to the upper end of the shaft 62 and the lower surface of washer 68 is in sliding contact with the upper surface of plate 66. Traveling block 48 can move freely back and forth, its path of travel being defined by the slot 64. It is to be noted that traveling block 48 is not only free to move back and forth along a horizontal path defined by slot 64 but also is free to pivot or rotate about the vertical axis of shaft 62. Block 48 rotates about its shaft 62 to take up any slack due to differences which may exist between the lengths of chain 42 and chain 46.

A chain 78 is looped around the pulley 60 of the traveling block and one end of the chain is coupled to actuate a first brake shoe linkage and the other end of the chain 78 is coupled to actuate a second brake shoe linkage. Chain 78 and pulley 60 are sized relative to each other to permit the chain to move freely over the pulley 60.

In the description of the operation which follows, it shall be assumed that the hand brake structure is initially in a relaxed or "no brakes on" condition. When the hand brakes of the railway freight or tank car are to be activated, the hand wheel 11 is manually rotated in a clockwise direction, for example, to set the brakes on a truck of the railway car. Referring specifically to FIG. 1, the end of the chain 33 coupled through the gear box 14 to the hand wheel is drawn up by being wrapped around a driven shaft or the like to cause each of the two bell crank type of levers 26 and 28 to rotate in a counterclockwise direction about the fulcrum defined by common shaft 30. Rotation of the bell crank type of levers 26 and 28 causes the links on the right ends of chains 42 and 46 to be pulled towards the right, and in turn, causes the traveling block 48 to move toward the right.

During operation of the bell crank type of levers it is to be noted that they move in unison and that they convert a substantially vertically applied force and displacement to a horizontally applied force and displacement. In addition, as mentioned previously, the pulley mechanism provided by chain 33 passing around pulley 34, and the arrangement of the chains 42 and 46 on levers 26 and 28 relative to the position of pulley 34, both provide respective mechanical advantages that result in a total horizontal pulling force on the brake shoe linkages that is greater than the force applied vertically by chain 33. Furthermore, the mechanical advantages remain substantially constant as the levers 26 and 28 rotate about fulcrum 30.

The shaft 62 and flat plate 66, in cooperation with the slot 64 of member 66, permits the traveling block to move freely to the right. Additionally, the traveling block is free to rotate about the longitudinal axis of shaft 62 to provide self compensation for slight difference in lengths of the chain 42 and 46. Therefore, the force transmitted from each of the bell crank type of levers 26 and 28 to the traveling block 48 is equally divided between the two chains 42 and 46.

Displacement of the traveling block toward the right causes the chain 78, which is looped around the pulley 60 of the traveling block, to be pulled to the right. One end of the chain 78 pulls on a first brake shoe linkage to brake a first wheel or set of wheels and the other end of the chain 78 pulls on a second brake shoe linkage to brake a second wheel or set of wheels. It is to be noted that pulley 60 of traveling block 48 is free to move along chain 78 to equalize the tension in each half portion of the chain and, therefore, the forces transmitted through each of the half portions of the chain are always equal.

It is to be understood that in the practice of the present invention it is not necessary that two bell crank type of levers 26 and 28, and two chains 42 and 46 be used. A single bell crank type of lever and a single chain connected to traveling pulley 48 could be used without departing from the present invention so long as the applied forces and loads do not exceed the capabilities of the respective components.

What is claimed is:

1. In a railway car braking mechanism for applying braking force to one or more brake shoes, the combination comprising brake shoe linkage for applying a braking force to a brake shoe, a crank type of lever having an arm which pivots about a fulcrum, a pulley secured at an outward disposed portion of said lever, means for connecting said brake shoe linkage to said lever at a radial location intermediate said fulcrum and said pulley, elongated force transmitting means having at least a portion which is flexible and looped through said pulley and having one end fixedly secured relative to said fulcrum, force applying means connected to the other end of the elongated force transmitting means for applying to said pulley a force acting in a second direction, thereby to rotate said lever about said fulcrum and to apply a greater force to the brake shoe linkage.

2. The combination claimed in claim 1 wherein said crank type of lever includes a curved surface in the region thereof between the fulcrum and the radial location where the brake shoe linkage is connected, at least a portion of said curved surface having a substantially constant radius of curvature relative to said fulcrum.

3. The combination claimed in claim 2 wherein said brake shoe linkage is flexible at least in the immediate portion thereof where it is connected to the lever, whereby the flexible portion of said linkage progressively contacts and conforms to the curved surface of the lever as the lever is rotated about said fulcrum.

4. In a railway car braking mechanism for applying braking force to one or more brake shoes, the combination comprising brake shoe linkage for applying a force acting in a given direction to one or more brake shoes, a bell crank type of lever having an arm which pivots about a fulcrum that is fixed relative to the frame of said car, a pulley secured at an outwardly disposed portion of the lever, means including a first chain for connecting said brake shoe linkage to said lever at a radial location between said fulcrum and said pulley, said lever having a curved surface in the region thereof between the fulcrum and said radial location where the brake shoe is connected, said curved surface being convex in the direction toward said first chain and at least a portion thereof having a substantially constant radius of curvature relative to said fulcrum, force transmitting means including a second chain which is looped through said pulley and has one end fixedly secured relative to the fulcrum, force applying means connected to the other end of the second chain for drawing the second chain around the pulley and thereby rotating said lever about said fulcrum in a direction away from the first chain, said second chain and pulley being arranged to provide a mechanical advantage that multiplies the force that is applied at said other end of the second chain, the connection of said first chain to said lever providing another mechanical advantage which further multiplies the force applied to the other end of the secured chain.

5. The combination claimed in claim 4 wherein the means that includes a first chain for connecting said brake shoe linkage to said lever further includes a floating pulley block connected to the end of the first chain opposite to the end that is connected to said lever, a third chain looped around said floating pulley block and having each end connected to a respective brake shoe linkage.

6. In a railway car braking mechanism for applying substantially equal braking forces to at least two brake shoes, the combination comprising first and second brake shoe linkages for applying respective forces to said two brake shoes, double bell crank type of lever means having two lever arms rotatable together about a common fulcrum that is fixed relative to the frame of said car, means including respective chain linkage for connecting each brake shoe linkage to a respective lever arm at a location thereon between said fulcrum and an outwardly disposed location, said lever means having two surfaces that are convexly curved in a general direction toward the brake shoe linkages, said curved surfaces being located adjacent the positions where the chain linkages connect to the lever arms and having at least portions thereof of substantially constant radii of curvature relative to the fulcrum, said curved surfaces being located closer to said fulcrum than the locations where the chain linkages are connected to the lever arms, a pulley attached to said lever arms at said outwardly disposed locations, a force transmitting chain secured at one end to the frame of the car and passing through the pulley in such a manner as to provide a force multiplying mechanical advantage when said chain transmits a force to the lever means, force applying means connected to the other end of the force transmitting chain to rotate said lever means and apply a pulling force to the brake shoe linkage.

7. The combination claimed in claim 6 wherein said chain linkage for connecting each brake shoe linkage to a respective lever arm includes, a floating pulley block having respective linkages connected to the two lever arms, a U-shaped chain looped through said pulley block and having its two ends respectively connected to said first and second brake shoe linkages.

* * * * *